United States Patent [19]

Aaron et al.

[11] Patent Number: 4,745,574

[45] Date of Patent: May 17, 1988

[54] MICROCODE TESTING OF PLA'S IN A DATA PROCESSOR

[75] Inventors: Robert W. Aaron; John Kuban; Douglas B. MacGregor; Robert R. Thompson, all of Austin, Tex.

[73] Assignee: Motorola, Inc., Schaumburg, Ill.

[21] Appl. No.: 97,276

[22] Filed: Sep. 17, 1987

Related U.S. Application Data

[63] Continuation of Ser. No. 660,590, Oct. 15, 1984, abandoned.

[51] Int. Cl.[4] .................................................. G06F 9/00
[52] U.S. Cl. ........................................................ 364/900
[58] Field of Search .................. 364/200, 900; 371/15, 371/16, 25, 21

[56] References Cited

U.S. PATENT DOCUMENTS

| | | | |
|---|---|---|---|
| 4,392,198 | 7/1983 | Shimazaki | 364/200 |
| 4,461,000 | 7/1984 | Young | 371/21 |
| 4,482,953 | 11/1984 | Burke | 364/200 |
| 4,488,228 | 12/1984 | Crudele et al. | 364/200 |
| 4,493,035 | 1/1985 | MacGregor et al. | 364/200 |
| 4,509,114 | 2/1982 | Leininger et al. | 364/200 |
| 4,524,415 | 6/1985 | Mills, Jr. et al. | 364/200 |

Primary Examiner—Gareth D. Shaw
Assistant Examiner—John G. Mills, III
Attorney, Agent, or Firm—John A. Fisher; Jeffrey Van Myers

[57] ABSTRACT

In a microcoded data processor, an instruction is provided which enables the microaddress for the micromachine to be externally specified. By way of this instruction, the processor may be directed to execute special microcoded routines otherwise unavailable during normal execution. These special microcoded routines may perform useful functions such as testing in an expeditious manner portions of the circuitry of the processor which would otherwise be difficult to test. For example, the functionality of regular structures such as instruction decoding and control programmable logic arrays (PLA's) may either be gated directly out to the tester or internally analyzed before the accumulated results are presented to the tester. On-board instruction caches may also be efficiently exercised to verify that the tag portion properly determines "hits" and "misses", and that the actual instruction cache portion functions accurately.

1 Claim, 4 Drawing Sheets

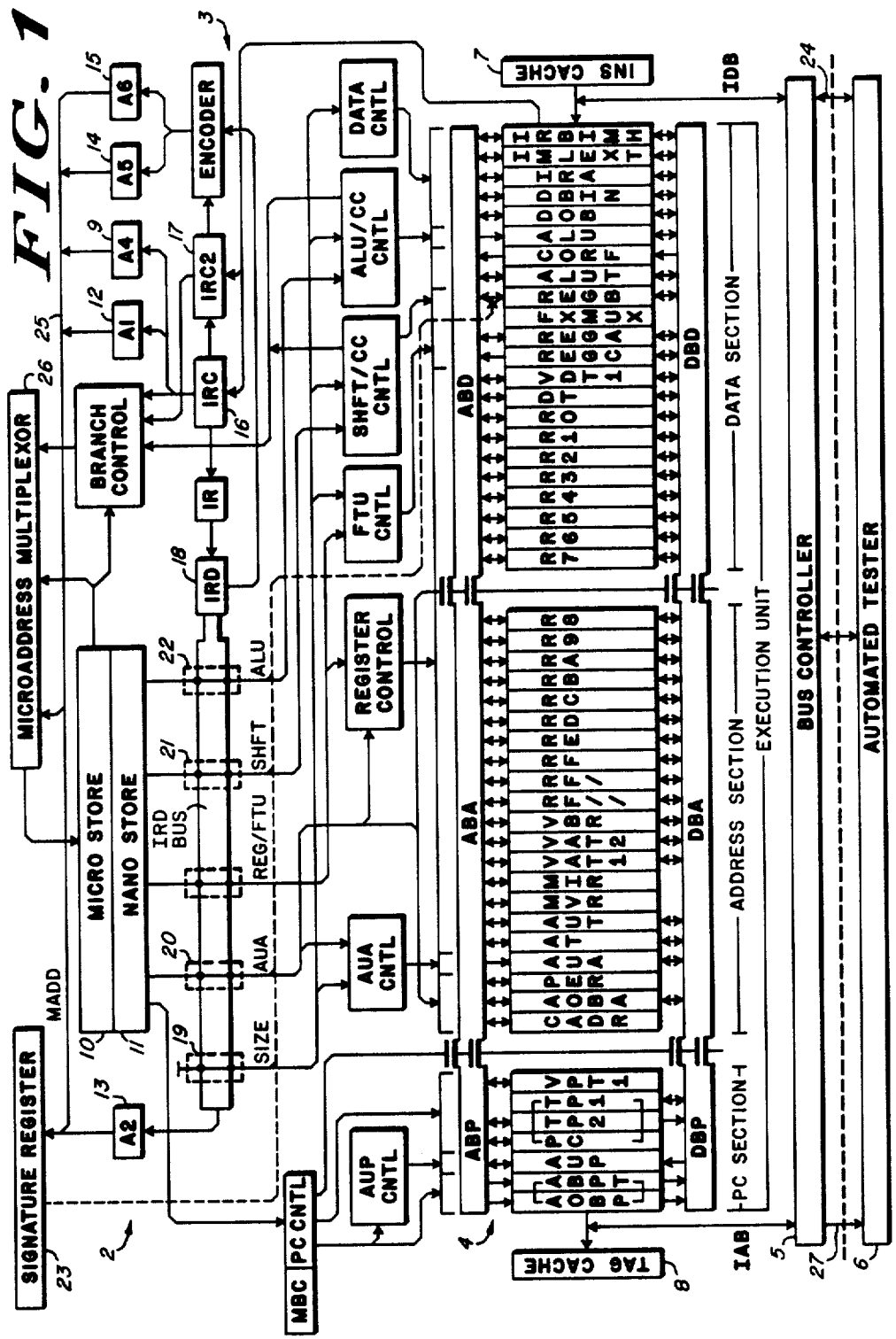

FIG. 2

ADVANCE INSTRUCTION PIPELINE [PIPE=CTOD]
    [IRC>IR,IRD]
    [IRB>IRC]
LOAD VALUE INTO IRB OF PIPELINE FOR USE IN CYCLE N+2
    AUT>DB>IRB
INCREMENT VALUE, FOR USE IN CYCLE N+3 [AU=ADD]
    AUT>DB>AU>AUT
    1>AU
ACCUMULATE RESULT IN SIGNATURE REGISTER USING VALUE
    LOADED INTO PIPELINE IN CYCLE N-2

FIG. 3

START READ OF VALUE TO BE USED IN CYCLE N+3
ADVANCE INSTRUCTION PIPELINE [PIPE=CTOD]
    [IRC>IR,IRD]
    [IRB>IRC]
FINISH READ STARTED IN CYCLE N-1 AND LOAD THIS
    VALUE INTO IRB OF PIPELINE FOR USE IN CYCLE N+2
    DBIN>DB>IRB
ACCUMULATE RESULT IN SIGNATURE REGISTER USING VALUE
    LOADED IN CYCLE N-2

FIG. 5

START READ OF VALUE TO BE USED IN IRD IN CYCLE
    N+3 [<> T0]
ADVANCE INSTRUCTION PIPELINE [PIPE=CTOD]
    [IRC>IR,IRD]
    [IRB>IRC]
FINISH READ STARTED IN CYCLE N-1 AND LOAD THIS VALUE
    INTO IRB OF PIPELINE FOR USE IN IRD IN CYCLE N+2
    DBIN>DB>IRB
EXTRACT A RESPECTIVE PORTION OF THE OUTPUT OF THE
    PARTICULAR PLA WHICH HAS BEEN SELECTED BY THE
    CODE IN THE AR LATCH FIELD, USING IN IRD THE
    VALUE LOADED INTO IRB IN CYCLE N-2 AND STORE
    THIS OUTPUT IN REGB [FTU=STCRC]
MEANWHILE, PROVIDE PLA OUTPUTS EXTRACTED IN CYCLE N-1
    TO TESTER ON ADDRESS BUS AS ADDRESS FOR THE READ
    IN CYCLE N+1
    REGB>AB>>AOB

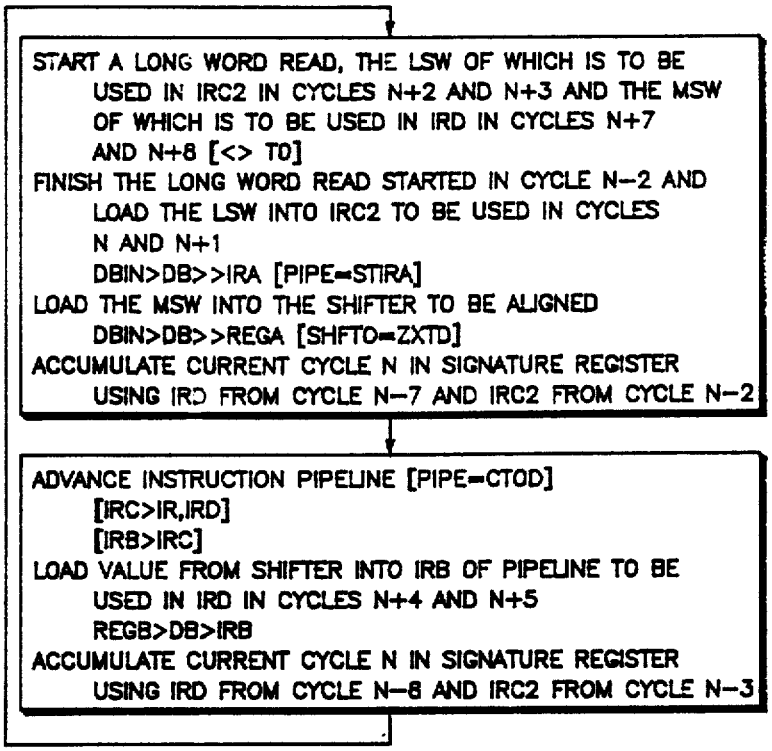
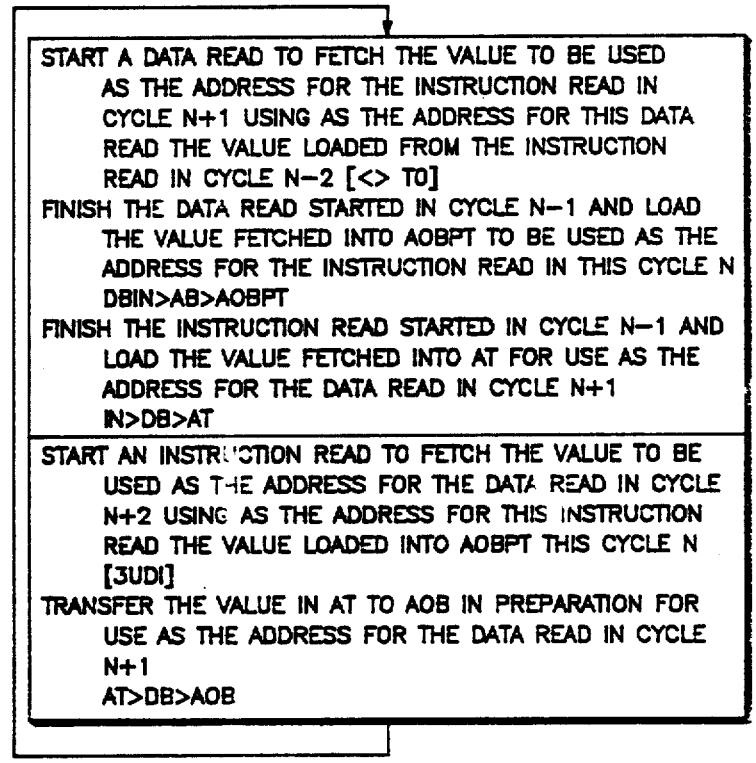
FIG. 4
FIG. 7

MICROCODE TESTING OF PLA'S IN A DATA PROCESSOR

This is a continuation of application Ser. No. 660,590, filed Oct. 15, 1984, now abandoned.

CROSS REFERENCE TO RELATED APPLICATIONS

Related subject matter is disclosed in the following applications filed simultaneously herewith and assigned to the Assignee hereof:

1. U.S. patent application Ser. No. 660,587, entitled DIRECT ENTRY INTO THE MICROCODE OF A DATA PROCESSOR, inventors Douglas B. MacGregor, William C. Moyer, John Zolnowsky and David S. Mothersole.

2. U.S. patent application Ser. No. 660,586, now abandoned, entitled MICROCODE TESTING OF A CACHE IN A DATA PROCESSOR, inventors John Kuban, Douglas B. MacGregor, Robert R. Thompson and David S. Mothersole.

FIELD OF THE INVENTION

The present invention relates generally to testing of a data processor to determine functionality, and, more particularly, to the testing of a microcoded data processor.

BACKGROUND OF THE INVENTION

In general, data processors are tested throughly by the manufacturer before being shipped to the end user thereof. The manufacturer's goal is to test each processor to a specific standard of functionality in the most efficient and cost effective way. Ideally, each processor would be required to correctly execute a carefully designed sequence of instructions selected to utilize substantially all of the circuitry contained within the processor. However, as the instruction set expands, the cost of such exhaustive testing soon becomes prohibitive. Instead, dedicated test circuitry is included within the processor so that those portions of the processor which are too difficult or time consuming to test implicitly may be explicitly tested by a suitable automated tester. If the processor is particularly powerful, the cost of providing the testing circuitry may even exceed the value of the functions being tested. If such functions are otherwise essential, the manufacturer's task becomes one of selecting the most cost effective way of testing that function.

SUMMARY OF THE INVENTION

It is an object of the present invention to provide a very cost effective way to test PLA's of a microcoded data processor.

Another object of the present invention is to provide a technique for a microcoded data processor to test PLA's using microcoded test routines.

Still another object of the present invention is to provide an efficient way for a microcoded data processor to test PLA's and the like using a minimum of dedicated test circuitry under control of special microcoded test routines.

In carrying out these and other objects of the present invention, there is provided, in one form, a microcoded data processor having an instruction register and at least one PLA for decoding an instruction in the instruction register and providing a plurality of outputs in response thereto. In accordance with the present invention, the processor includes a special microroutine adapted to cyclically accept as an instruction operand a selected value, load the selected value into the instruction register, extract a selected portion of the plurality of outputs provided by the PLA in response to the decoding of the selected value, and then provide as an instruction address the extracted portion of the plurality of outputs of the PLA. In this manner, the processor may cooperate with a tester to verify the functionality of the PLA.

BRIEF DESCRIPTION OF THE DRAWINGS

FIG. 1 is a block diagram of a microcoded data processor adapted to practice the present invention.

FIG. 2 is a flow diagram of one microcoded test routine for testing a first portion of the instruction decoding circuitry of the processor of FIG. 1.

FIG. 3 is a flow diagram of another microcoded test routine for testing the first portion of the instruction decoding circuitry of the processor of FIG. 1.

FIG. 4 is a flow diagram of a microcoded test routine for testing a second portion of the instruction decoding circuitry of the processor of FIG. 1.

FIG. 5 is a flow diagram of a set of microcoded test routines for testing a third portion of the instruction decoding circuitry of the processor of FIG. 1.

FIG. 7 is a flow diagram of a microcoded test routine for testing the instruction cache of the processor of FIG. 1.

DESCRIPTION OF THE INVENTION

Figure 6:
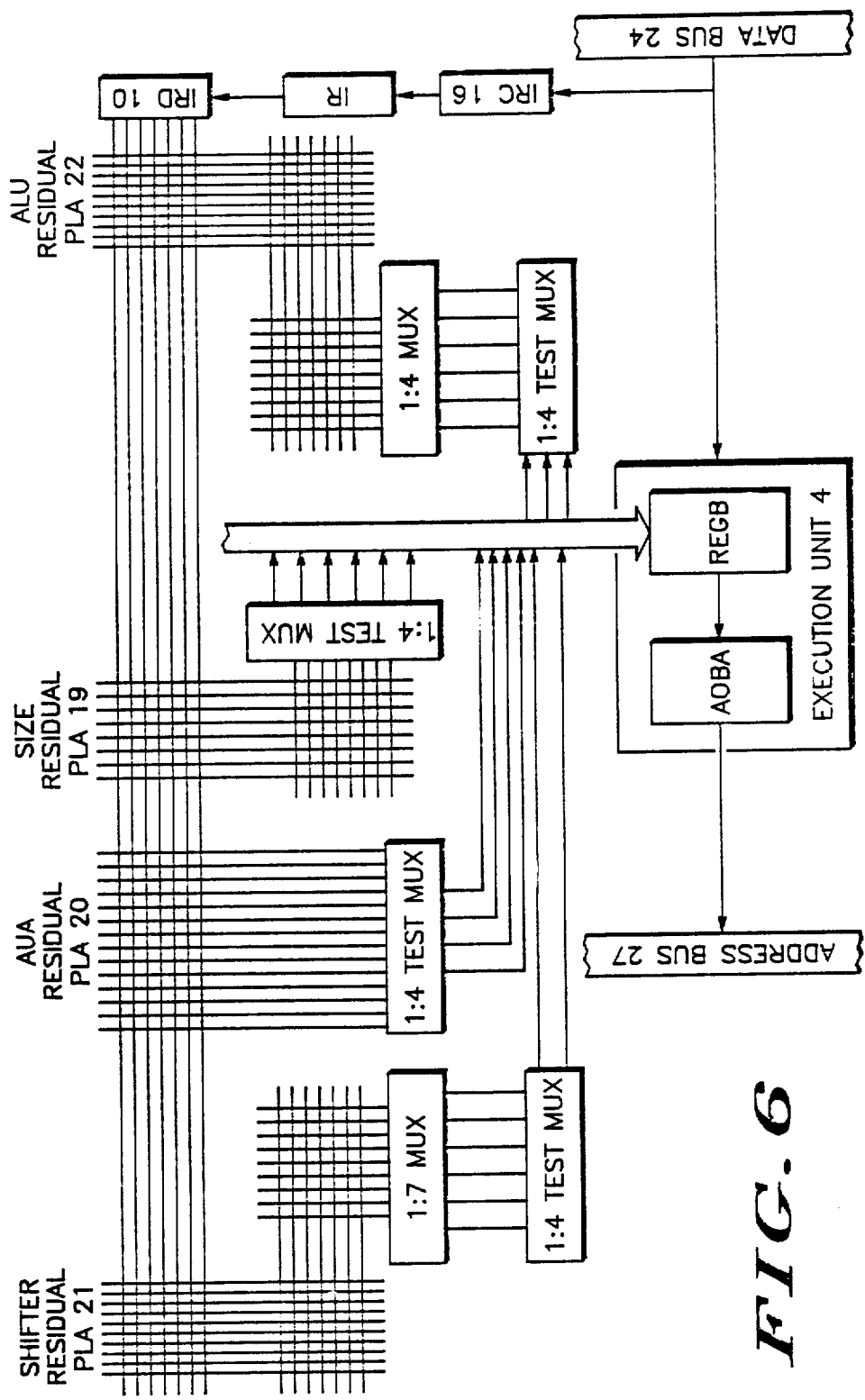
FIG. 6 is a schematic diagram illustrating special test circuitry for providing multiplexed access to the numerous control signals produced by third portion of the instruction decoding circuitry of the processor of FIG. 1 during the execution of the microcoded test routines of FIG. 5.

Shown in FIG. 1 is a microcoded data processor 1 similar to that shown and described in U.S. Pat. No. 4,488,228, entitled "Virtual Memory Data Processor". In general, the processor 1 includes a micromachine 2 responsible for accomplishing the execution of instructions received via an instruction pipeline 3, using a segmented execution unit 4. A bus controller 5 cooperates with the micromachine 2 in transferring the instructions and any necessary data operands between the processor 1 and external resources such as an automated tester 6. To reduce bus bandwidth requirements and to increase execution speed, processor 1 includes an instruction cache 7 which cooperates with a set associative tag cache 8 to provide a local store for recently used instructions or portions thereof.

Since most of the details of the construction and operation of the processor 1 are beyond the scope of the present invention, only relevant portions will be described herein. However, a more complete description of the bus controller 5 may be found in U.S. Pat. No. 4,633,437 and in copending U.S. application Ser. No. 655,015. A description of the instruction pipeline 3 may be found in copending U.S. application Ser. No. 625,066, now abandoned. The automated tester 6 may be any of a number of commercially available units such as the GenRad Model GR16.

As described in U.S. Pat. No. 4,488,228, the processor 1 is adapted to respond to certain types of error conditions by stacking off a block of information relating to its internal state before vectoring to an appropriate error handler. Typically, after the cause of the error has been corrected, the error handler executes a special "ReTurn from Exception" (RTE) instruction which restores the state using the stacked information and then allows the processor 1 to resume execution from the precise point in the instruction execution sequence at which the error was detected.

For the purposes of the present invention, the most important item of information which is stored on the stack is the current value of the microaddress program counter (MICRO PC). During the restore operation, this value is loaded into the A4 latch 9 and then used by the micromachine 2 to select for execution the next microinstruction in micro store 10 and nano store 11. During normal execution, if the value which is restored is not the same as the value which was stored, the processor 1 will be unable to properly resume execution of the faulted instruction. Thus, the user must take particular care in assuring that this portion of the stacked information is unchanged during the error handling procedure. On the other hand, as explained in U.S. Pat. No. 4,524,415, certain portions of the stacked information may be precisely changed so that the processor 1 will resume execution of the faulted instruction in a alternative manner. In general, except for such predefined changes, no other changes may be made in the stacked information without affecting the operation of the processor 1 in an undefined manner.

In the course of designing the processor described in U.S. Pat. Nos. 4,488,228, 4,524,415 and 4,493,035, it was realized that the processor described therein possessed the inherent ability to restore itself such that it would resume execution with any of the plurality of microinstructions. However, due to restrictions on the size of the micro store 10 and the nano store 11, this capability was never utilized to perform a useful function. When the processor 1 was thereafter taken up for design, it soon became evident that the enhanced functionality very significantly increased the testability problem. Although most of this increased power could be tested in a cost effective manner using conventional test procedures or special purpose test logic, certain areas of the circuitry of the processor 1 were particularly difficult or expensive to test with such techniques. It was therefore proposed that special microinstruction sequences be provided in the micro store 10 and nano store 11 to exercise dedicated test logic incorporated elsewhere in the processor 1. In this manner, not only were there significant reductions in the size of such test logic, but also in the time required to test the respective areas of circuitry in the processor 1.

Upon carefully examining the internal architecture and circuit arrangement within the processor 1, it was discovered that only a relatively few of the major circuit components were amenable to testing using microcoded test routines: the primary sequencing "Programmable Logic Arrays" (PLA's) A1 12, A2 13, A5 14 and A6 15 which decode the contents of the IRC 16, IRC2 17 and IRD 18 comprising the instruction pipeline 3; the residual control decode PLA's 19, 20, 21 and 22 (typical of a total of eight, all of which are not shown for convenience) which decode the current instruction in IRD 18; and the instruction and tag caches 7 and 8, respectively. Other areas of the processor 1 proved to be more efficiently tested either functionally using macroinstruction sequences, or explicitly using relatively conventional test circuitry such as an on-board signature analysis register 23. At the same time, the presence of the signature analysis register 23 makes it all the more efficient to test using microcoded test routines.

In preparation for testing the primary sequencing PLA's 12-15, the tester 6 must prepare a stack frame having all of the information necessary for the processor 1 to restore a valid state, in the format illustrated in Appendix I hereto. In the MICRO PC field, the tester 6 will insert the address within the micro store 10 and nano store 11 of one of the three (3) microinstructions shown in Appendix II hereto. In addition, the tester 6 must insert into the AR LATCH portion of the SSWI field, a code which indicates an appropriate one of the several primary sequencing PLA's 12-15 to be tested. The tester 6 should also insert a suitable initial starting value, say zero (0), for the particular PLA test into the [AUT.H:AUT.L] field. Similarly, other suitable values should be inserted into the IRD, IR, IRC and IRC2 fields so that the line will be initialized properly. If appropriate for the selected test routine, as explained below, the tester 6 must also set the CRC field in the SSWI to enable the signature register 23. Thereafter, at the appropriate point in a testing sequence, the tester 6 then provides an RTE instruction in the instruction stream of the processor 1 via the data bus 24.

If, for example, the tester 6 chooses to insert into the stack frame the address of the first microinstruction shown in Appendix II, the processor 1, upon executing the RTE instruction, will proceed as illustrated in FIG. 2 by advancing the pipeline 3 before loading the specified initial value into the instruction pipe 3. Depending upon the AR LATCH code, either PLA A1 12 or A2 13 will provide a "microaddress" to the signature register 23 on the Microaddress ADDress (MADD) bus 25. Ignoring this microaddress, the micromachine 2 instead branches directly back to the current microinstruction using a direct branch path through the microaddress multiplexor 26. In this manner, the processor 1 will continue looping on this one microinstruction, incrementing each time the value which is loaded into the instruction pipeline 3. After a suitable number of cycles, the tester 6 can terminate the looping by resetting the processor 1. Coming out of reset, the processor 1 automatically transfers the residue in the signature register 23 into REGB in the data section of the execution unit 4 and then into AUT in the address section of the execution unit 4. The tester 6 may obtain this residue by simply forcing a bus error on the first bus cycle after reset so that the processor 1 will stack off all of the internal state information, including AUT. Using this microinstruction, the tester 6 can very rapidly verify exhaustively the functionality of each of the primary sequencing PLA's A1 12 through A4 15.

If, on the other hand, the tester 6 chooses to insert into the stack frame the address of the second microinstruction shown in Appendix II into the MICRO PC field, the processor 1 will proceed as illustrated in FIG. 3 by advancing the pipeline 3 before loading into the instruction pipe 3 a value which is provided by the tester 6 via the data bus 24. Again, depending upon the AR LATCH code, either PLA A1 12 or A2 13 will provide a "microaddress" to the signature register 23 on the MADD bus 25. Ignoring this microaddress, the micromachine 2 will instead branch directly to the current microinstruction using the direct branch path through the microaddress multiplexor 26. In this manner, the processor 1 will continue looping on this microinstruction, accepting each time the value which is to be loaded into the instruction pipeline 3. After a suitable number of cycles, the tester 6 can terminate the looping by resetting the processor 1 and then force the bus error so that the processor 1 will stack off the residue. Thus, by using this microinstruction, the tester 6 can selectively verify the functionality of the primary sequencing PLA's A1 12 and A2 13.

If, instead, the tester 6 chooses to insert into the stack frame the address of the third microinstruction sequence shown in Appendix II into the MICRO PC field, the processor 1 will proceed as illustrated in FIG. 4 to accept from the tester 6 via the data bus 24 a specific pair of values to be loaded into IRC2 17 and IRD 18 in the instruction pipeline 3. In the first microinstruction in this sequence, the processor 1 will load the new IRC2 value directly into IRC2 17, and enable the shifter FXMUX in the data section of the execution unit 4 to realign the new IRD value. In the next microinstruction in this sequence, the processor 1 will load the new IRD value into the pipeline 3. During the execution of each microinstruction, the "microaddress" provided by the selected PLA A5 14 or A6 15 is accumulated by the signature register 23. Since the new IRC2 and IRD values are loaded every other microinstruction cycle in a staggered sequence, the effect of each on the selected PLA is accumulated twice by the signature register 23. After allowing the processor 1 to continue repeating this sequence of two microinstructions for an appropriate number of microinstruction cycles, the tester 6 can reset the processor 1 and obtain the residue in the signature register 23. Using this short sequence of microinstructions, the tester 6 can selectively verify the functionality of the primary sequencing PLAs A5 14 and A6 15.

In preparation for testing the residual control PLA's 19-22, the tester 6 must also prepare a stack frame having all of the information necessary for the processor 1 to restore a valid state, in the format illustrated in Appendix I hereto. In the MICRO PC field, the tester 6 may insert the address within the micro store 10 and nano store 11 of one of the seven (7) microinstructions shown in Appendix III hereto. In addition, the tester 6 must insert into the AR Latch portion of the SSWI field, a code which indicates which portion of the several residual control PLA's 19-22 is to be tested. Thereafter, at the appropriate point in the testing sequence, the tester 6 then provides the RTE instruction in the instruction stream of the processor 1 via the data bus 24.

Regardless of which address the tester 6 chooses to insert into the MICRO PC field in the stack frame from among those of the microinstructions shown in Appendix III, the processor 1 will proceed as illustrated in FIG. 5 to read from the tester 6 via the data bus 24 a specific value to be loaded into the instruction pipeline 3. The processor 1 will then extract via special 7-way multiplexing circuitry, such as that shown by way of illustration in FIG. 6, the selected portion of the resulting outputs of the several PLAs 19-22 and store these outputs in REGB in the data section of the execution unit 4. Simultaneously, the processor 1 will provide the outputs stored during the last execution of this microinstruction to the tester 6 via the address bus 27 just as if these outputs constituted the "address" for the next read bus cycle. Thereafter, the processor 1 will continue looping on this microinstruction, reading each time the next value from the tester 6 via the data bus 24, until reset by the tester 6. By successively using each of these microinstructions, the tester 6 can selectively verify the functionality of the residual control PLAs 19 through 22.

In preparation for testing the instruction and tag caches 7 and 8, respectively, the tester 6 must prepare a valid stack frame, with the address of the first microinstruction in Appendix IV hereto in the MICRO PC field. At the appropriate point in the testing sequence, the tester 6 may thereafter provide the RTE instruction in the instruction stream of the processor 1 via the data bus 24. In response, the processor 1 will initiate a data operand cycle, providing via the address bus 27 a "data address" value which has been initialized by the tester 6 in the AOB field of the stack frame. The processor 1 will then accept from the tester 6 via the data bus 24 an "instruction address" value. Using this "instruction address" value, the processor 1 attempts to access the instruction cache 7 via the tag cache 8. Since both the instruction cache 7 and the tag cache 8 will be initially empty, there should be no "hit" in the tag cache 8. The processor 1 will therefore automatically initiate an instruction operand cycle, providing the "instruction address" value on the address bus 27. The processor 1 will then accept from the tester 6 via the data bus 24 an "instruction" value. Since the instruction access "missed", the instruction cache 7 will automatically load this "instruction" value while the tag cache 8 concurrently loads the corresponding "instruction address" value. After substituting this new "instruction" value for the current "data address" value, the processor 1 repeats the cycle. By returning an appropriate sequence of values, the tester 1 can induce the processor 1 to sequentially fill up both the instruction cache 7 and the tag cache 8. If the tester 6 then provides in response to a subsequent data operand cycle an "instruction address" value which causes a "hit" in the tag cache 8, the processor 1 will substitute the corresponding "instruction" value retrieved from the instruction cache 7 for the current "data address" value and then proceed to the next cycle. In this manner, the tester 6 can determine the functionality of the instruction cache 7 by comparing the "instruction" values which should have been loaded into the instruction cache 7 to the "data addresses" which are provided for the respective data operand cycles. Similarly, the tester 6 can determine the functionality of the tag cache 8 by verifying that the "data addresses" and "instruction addresses" are as they should be if the tag cache 8 "hits" or "no hits", respectively.

Although the present invention has been described in the context of testing certain portions of the circuitry of the data processor 1, it will be apparent that other portions may also be tested efficiently using this technique in processors having suitable circuit configurations. In addition, the mechanism for providing direct entry into the microcode may be employed advantageously in other applications. For example, a special microroutine may be provided to implement an instruction not available in the standard instruction set. This special instruction may be a modified form of an existing instruction or one which is unique to a particular class of application or customer. In such situations, the microcode will be appropriately constructed to implement the desired functionality. The general format for such microinstructions, including those set forth in Appendices II through IV, is shown in Appendix V.

APPENDIX I

```
 3               1 1                  0
 1               6 5                  0
+----------------+--------------------+
|     PSW        |    REAL PC.H       |
+----------------+--------------------+
|   REAL PC.L    |  1011 : VECTOR #   |
+----------------+--------------------+
|    SSWB.H      |     SSWB.L         |
+----------------+--------------------+
|    IM/IRC      |      IRB           |
+----------------+--------------------+
|    PADS.H      |     PADS.L         |
+----------------+--------------------+
|    AOB.H       |     AOB.L          |
+----------------+--------------------+
|    DOB.H       |     DOB.L          |
+----------------+--------------------+
|     IRD        |      IR            |
+----------------+--------------------+
|   AOBPT.H      |    AOBPT.L         |
+----------------+--------------------+
|    TP1.H       |     TP1.L          |
+----------------+--------------------+
|    TP2.H       |     TP2.L          |
+----------------+--------------------+
|   DBIN.H       |    DBIN.L          |
+----------------+--------------------+
|    IRC2        |      IRA           |
+----------------+--------------------+
|    SSWI*       |    MICRO PC**      |
+----------------+--------------------+
|   ALUT.H       |    ALUT.L          |
+----------------+--------------------+
|    SPARE       |     SPARE          |
+----------------+--------------------+
|    DT.H        |     DT.L           |
+----------------+--------------------+
|    PER.H       |     PER.L          |
+----------------+--------------------+
| SHFTCNTRL.H    |  SHFTCNTRL.L       |
+----------------+--------------------+
|    AT.H        |     AT.L           |
+----------------+--------------------+
|   REGB.H       |    REGB.L          |
+----------------+--------------------+
|   REGA.H       |    REGA.L          |
+----------------+--------------------+
|    AUT.H       |     AUT.L          |
+----------------+--------------------+
```

*WHERE SSWI HAS THE FOLLOWING FORMAT:
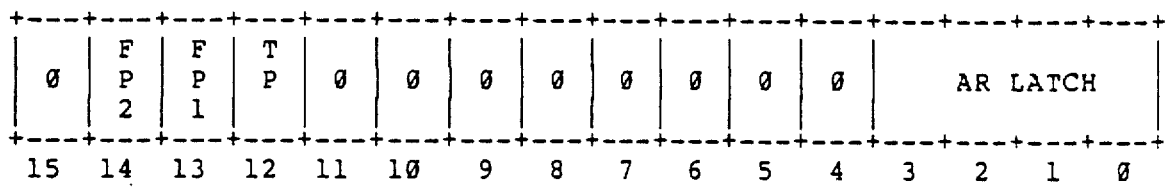
**AND WHERE MICRO PC HAS THE FOLLOWING FORMAT:
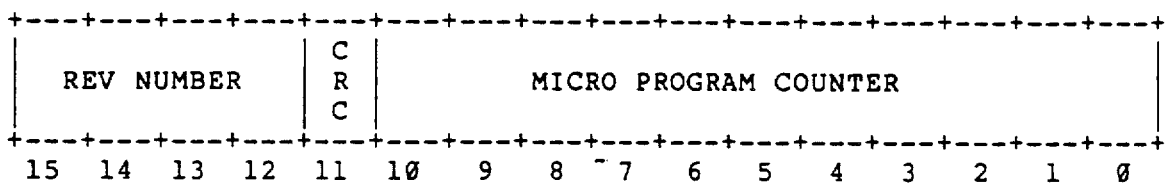
APPENDIX II
1ST PLA DIAGNOSTIC ROUTINE
ENTERED BY RTE
```
+---+--------+-----+---------------+-----+
|JC8| DGPA1  | 49d |               | DB  |
+---+--------+-----+---------------+-----+
|BYTE|INST|    RX |    RY |   .    |     |
+----+----+-------+-------+--------+-----+
 "LOAD IRD(C)"                       ADD
 AUT>DB>IRB                          NIL
 "INCREMENT & BUILD IRD(D)"           X
 AUT>DB>AU>AUT                        X
 1>AU                                 X
 "PLA SELECTED BY AR LATCH"          NONE
                                     NF
                                     CTOD
                                    12/07
+-----------------------------------+-----+
JD8       DGPA1     (JC8)
```

2ND PLA DIAGNOSTIC ROUTINE
ENTERED BY RTE

| JE8 | DGPB1 | 73c | | DB |
|---|---|---|---|---|
| WORD | DATA | RX | RY <> T0 | |
| "READ VALUE TO BE TESTED, IRD(D) | | | | X |
| "PLA SELECTED BY AR LATCH" | | | | NIL |
| DBIN>DB>IRB | | | | X |
| | | | | X |
| | | | | X |
| | | | | NONE |
| | | | | NF |
| | | | | CTOD |
| | | | | 12/07 |

JF8      DGPB1      (JE8)

2

A5 PLA DIAGNOSTIC ROUTINE
ENTERED BY RTE

| JD9 | DGPC1 | 73e | | DB |
|---|---|---|---|---|
| LONG | INST | RX | RY <> T0 | |
| "READ NEXT IRD:IRC2 VALUE" | | | | X |
| "LOAD IRC2" | | | | NIL |
| DBIN>DB>>IRA | | | | X |
| "SHIFT IRD" | | | | ZXTD |
| DBIN>DB>>REGA | | | | X |
| "PLA SELECTED BY AR LATCH" | | | | NONE |
| "NEED SHFTCNT INITIALIZED" | | | | NF |
| | | | | STIRA |
| | | | | 12/05 |

| JE9 | DGPC2 | 73f | | DB |
|---|---|---|---|---|
| X | DATA | RX | RY . | |
| "LOAD NEW IRD" | | | | X |
| REGB>DB>IRB | | | | NIL |
| | | | | X |
| | | | | X |
| | | | | X |
| | | | | NONE |
| | | | | NF |
| | | | | CTOD |
| | | | | 12/05 |

JF9      DGPC1      (JD9)

APPENDIX III

```
IRD PLA - COLUMN 1 - DIAGNOSTIC ROUTINE
ENTERED BY RTE
+---+--------+-----+--------------+-----+
|JA6| DGPI1  | 7b0 |              | DB  |
+---+-+----+-+--+--+-+---+--------+-----+
| WORD|DATA|   RX|   RY| <>   T0        |
+-----+----+-----+-----+--------+-------+
| "READ VALUE TO BE TESTED (F)" |    X  |
| DBIN>DB>IRB                   |  AND  |
| "USE CRC (A) AS NEXT ADDRESS" |  CC1  |
| REGB>AB>>AOB                  |    X  |
| "PLA SELECTED BY AR LATCH"    | DIAG1 |
|                               | STCRC |
|                          --   |   NF  |
|                               | CTOD  |
|                               |       |
|                               | 12/11 |
+-------------------------------+-------+
  JB6       DGPI1    (JA6)

IRD PLA - COLUMN 2 - DIAGNOSTIC ROUTINE
ENTERED BY RTE
+---+--------+-----+--------------+-----+
|JC6| DGPI2  | 7b1 |              | DB  |
+---+-+----+-+--+--+-+---+--------+-----+
| WORD|DATA|   RX|   RY| <>   T0        |
+-----+----+-----+-----+--------+-------+
| "READ VALUE TO BE TESTED (F)" |    X  |
| DBIN>DB>IRB                   |  COL2 |
| "USE CRC (A) AS NEXT ADDRESS" |  CC2  |
| REGB>AB>>AOB                  |    X  |
| "PLA SELECTED BY AR LATCH"    | DIAG2 |
|                               | STCRC |
|                          .    |   NF  |
|                               | CTOD  |
|                               |       |
|                               | 1/02  |
+-------------------------------+-------+
  JD6       DGPI2    (JC6)
```

2

```
IRD PLA - COLUMN 3 - DIAGNOSTIC ROUTINE
ENTERED BY RTE
+---+---------+-----+--------------+-----+
|JE6| DGPI3   | 7b2 |              | DB  |
+---+-+-----+--+---+-+----+--------+-----+
| WORD|DATA|   RX|    RY| <>  T0           |
+-----+----+------+------+--------+-----+
| "READ VALUE TO BE TESTED (F)"   |    X|
| DBIN>DB>IRB                     | COL3|
| "USE CRC (A) AS NEXT ADDRESS"   |  CC3|
| REGB>AB>>AOB                    |    X|
| "PLA SELECTED BY AR LATCH"      |DIAG3|
|                                 |STCRC|
|                                 |   NF|
|                                 | CTOD|
|                                 |     |
|                                 | 1/02|
+---------------------------------+-----+
  JF6      DGPI3    (JE6)

IRD PLA - COLUMN 4 - DIAGNOSTIC ROUTINE
ENTERED BY RTE
+---+---------+-----+--------------+-----+
|JA7| DGPI4   | 7e3 |              | DB  |
+---+-+-----+--+---+-+----+--------+-----+
| WORD|DATA|   RX|    RY| <>  T0           |
+-----+----+------+------+--------+-----+
| "READ VALUE TO BE TESTED (F)"   |    X|
| DBIN>DB>IRB                     |  NIL|
| "USE CRC (A) AS NEXT ADDRESS"   |    X|
| REGB>AB>>AOB                    |    X|
| "PLA SELECTED BY AR LATCH"      |DIAG4|
|                                 |STCRC|
|                                 |   NF|
|                                 | CTOD|
|                                 |     |
|                                 | 1/02|
+---------------------------------+-----+
  JB7      DGPI4    (JA7)
```

IRD PLA - COLUMN 5 - DIAGNOSTIC ROUTINE
ENTERED BY RTE

| JC7 | DGPI5 | 7e8 | | DB |
|---|---|---|---|---|
| WORD | DATA | RX | RY | <> T0 |
| "READ VALUE TO BE TESTED (F)" DBIN>DB>IRB "USE CRC (A) AS NEXT ADDRESS" REGB>AB>>AOB "PLA SELECTED BY AR LATCH" | | | | X NIL X X DIAG5 STCRC NF CTOD 1/02 |

JD7      DGPI5    (JC7)

IRD PLA - COLUMN 6 - DIAGNOSTIC ROUTINE
ENTERED BY RTE

| JE7 | DGPI6 | 499 | | DB |
|---|---|---|---|---|
| WORD | DATA | RX | RY | <> T0 |
| "READ VALUE TO BE TESTED (F)" DBIN>DB>IRB "USE CRC (A) AS NEXT ADDRESS" REGB>AB>>AOB "PLA SELECTED BY AR LATCH" | | | | X NIL X X DIAG6 STCRC NF CTOD 1/02 |

JF7      DGPI6    (JE7)

4

IRD PLA - COLUMN 7 - DIAGNOSTIC ROUTINE
ENTERED BY RTE

```
+---+--------+------+-------------+-----+
|JA8| DGPI7  | 49b  |             | DB  |
+---+-+----+-+-+----+-+----+------+-----+
| WORD|DATA|  RX  |  RY| <>   T0        |
+-----+----+------+----+----------+-----+
| "READ VALUE TO BE TESTED (F)"   |  X  |
| DBIN>DB>IRB                     | NIL |
| "USE CRC (A) AS NEXT ADDRESS"   |  X  |
| REGB>AB>>AOB                    |  X  |
| "PLA SELECTED BY AR LATCH"      |DIAG7|
|                                 |STCRC|
|                                 | NF  |
|                                 |CTOD |
|                                 |     |
|                                 |1/02 |
+---------------------------------+-----+
  JB8     DGPI7    (JA8)
```

1

APPENDIX IV

CACHE DIAGNOSTIC ROUTINE
ENTERED BY RTE

```
+---+--------+------+----------------+-----+
|JA9| DGCA1  | 7ea  |                | DB  |
+---+-+----+-+-+----+-+----+---------+-----+
| LONG|INST|  RX  |  RY| <>   T0           |
+-----+----+------+----+-------------+-----+
| "USE PREVIOUS CACHE ACCESS"        |  X  |
| "DATA AS AN ADDRESS (2 BACK)"      | NIL |
| IN>DB>AT                           |  X  |
| "READ NEXT ADDRESS TO BE CHECKED   |  X  |
| DBIN>AB>AOBPT                      |  X  |
|                                    |NONE |
|                                    |JMP2 |
|                                    |UPIPE|
|                                    |     |
|                                    |2/13 |
+------------------------------------+-----+
|JB9| DGCA2  | 74b  |DBCC2    (EQ7)  | DB  |
+---+-+----+-+-+----+-+----+---------+-----+
|   X|DATA|  RX  |  DTY| .                 |
+-----+----+------+----+-------------+-----+
| "ACCESS TEST ADDRESS"              |  X  |
| "STORE ADDRESS"                    %COL3 |
| AT>DB>AOB                          |  X  |
|                                    |  X  |
|                                    |  X  |
|                                    |NONE |
|                                    |3PFI |
|                                    |3UDI |
|                                    |     |
|                                    |1/08 |
+------------------------------------+-----+
  JC9     DGCA1    (JA9)
```

APPENDIX V
MICROINSTRUCTION LISTING

```
        +--- CO-ORDINATE OF BOX     MICRO SEQUENCER
        |   +--- LABEL OF BOX          INFORMATION
        |   |      +-- MICRO ADDRESS       |
        |   |      |    +-- ORIGIN         |
        V   V      V    V                  V
       +---+------+----+--------------+-----+
       |AA1| EXAM1| 040| EXAM1  (1)   | A1  |
       +---+-+--+-+--+-+-----+--------+-----+
       |SIZE|PADB| RXS|  RYS| R/W TIME TYPE|
       +----+----+----+-----+--------+-----+
       | "COMMENTS"                   | AU  |
       | TRANSFERS                    | ALU |
       |     >> T1 DESTINATION        | CC  |
       |     >  T3 DESTINATION        | SHFTO|
       |                              | SHFTC|
       |                              | FTU |
       |                              | PC  |
       |                              | PIPE|
       |                              |     |
       |                              | DATE|
       +------------------------------+-----+
```

ORIGIN: if shared, co-ordinate of origin
        if origin, # of boxes sharing with this box

DATA ACCESS INFORMATION:

```
R/W                           TIME
    .   - no access              X  - no timing associated
    <W> - write                  T1 - write to aob in T1
    <>  - read                   T3 - write to aob in T3
    SPC - special signal         T0 - aob writen before T1
    EXL - latch exception TYPE
    .,<>,<W> on R/W
    .      - normal access
    UNK    - program/data access
    CNORM  - conditional normal
    CUNK   - conditional prog/data
    AS     - alternate address space
    CPU1   - cpu access - different bus error
    CPU2   - cpu access - normal bus error
    RMC    - read-modify-write access
   SPC on R/W
    RST1   - restore stage 1
    RST2   - restore stage 2
    HALT   - halt pin active
    RSET   - reset pin active
    SYNC   - synchronize machine
   EXL on R/W
    BERR   - bus error          PRIV - privilege viol.
    AERR   - address error      TRAC - trace
```

```
LINA   - line a              TRAP  - trap
LINF   - line f              COP   - protocol viol.
ILL    - illegal             FORE  - fomat error
DVBZ   - divide by zero      INT   - interrupt 1st stack
BDCK   - bad check           INT2  - interrupt 2nd stack
TRPV   - trap on overflow    NOEX  - no exception
```

MICRO SEQUENCER INFORMATION:

```
DB   - direct branch - next microaddress in microword
BC   - conditional branch
A1   - use the A1 PLA sample interrupts and trace
A1A  - use the A1 PLA sample interrupts, do not sample
       trace
A1B  - use the A1 PLA do not sample interrupts or trace
A2   - use the A2 PLA
A7   - functional conditional branch (DB or A2 PLA)
A4   - use the A4 latch as next micro address
A5   - use the A5 PLA
A6   - use the A6 PLA
```

SIZE:

```
size = byte      nano specified constant value
size = word      nano specified constant value
size = long      nano specified constant value
size = ircsz    irc[11]=0/1 => word/long
size = irsz     ird decode of the instruction size
                (byte/word/long). Need to have file
                specifying residual control
size = ssize    shifter control generates a size
                value. The latch in which this value
                is held has the following encoding
                     000 = byte
                     001 = word
                     010 = 3-byte
                     011 = long
                     100 = 5-byte *** must act as
                           long sized
```

RXS - RX SUBSTITUTIONS:

RX is a general register pointer. It is used to point at either special purpose registers or user registers. RX generally is used to translate a register pointer field within an instruction into the control required to select the the appropriate register.

```
rx = rz2d/rxd    conditionally substitute rz2d
                 use rz2d and force rx[3]=0
                     mul.l        0100 110 000 xxx xxx
                     div.l        0100 110 001 xxx xxx
```

```
rx = rx           ird[11:9] muxed onto rx[2:0]
                  rx[3] = 0 (data reg.)
                      (unless residual points)
                  rxa then rx[3] = 1
                      (residual defined in opmap)

rx = rz2          irc2[15:12] muxed onto rx[3:0]
                  rx[3] is forced to 0 by residual control
                      div.1          0100 110 001 xxx xxx
                      bit field reg  1110 1xx 111 xxx xxx rx = rp           rx[3:0] = ar[3:0]
                  The value in the ar latch must be
                  inverted before going onto the rx bus
                  for movem r1,-(ry) 0100 100 01x 100 xxx rx = rz           irc[15:12] muxed onto rx[3:0]
                  (cannot use residual control)

rx = ro2          rx[2:0] = irc2[8:6]
                  rx[3] = 0 (data reg.)
                  Used in Bit Field, always data reg rx = car          points @ cache address register
rx = vbr          points @ vector base register rx = vatl         points @ vatl rx = dt           points @ dt rx = crp          rx[3:0] = ar[3:0]
                  The value in ar points at a control
                  register (i.e. not an element of the
                  user visible register array)

rx = usp          rx[3:0] = F
                  force effect of psws to be negated (0)

rx = sp           rx[2:0] = F,
                      if psws=0 then address   usp
                      if psws=1 & pswm=0 then isp
                      if psws=1 & pswm=1 then msp
```

RYS - RY SUBSTITUTIONS:

```
ry = ry           ird[2:0] muxed onto ry[2:0]
                  ry[3] = 1 (addr reg.) unless residual
                      points
                  ryd then ry[3] = 0. (residual defined
                      in opmap)

ry = ry/dbin      This is a conditional substitution
     ry/dob       for the normal ry selection (which
``` includes the residual substitutions like dt) with dbin or dob. The substitution is made based on residual control defined in opmap (about 2 ird lines) which selects the dbin/dob and inhibits all action to ry (or the residually defined ry). Depending upon the direction to/from the rails dbin or dob is selected. If the transfer is to the rails then dbin is substituted while if the transfer is from the rails dob is substituted.

Special case: IRD = 0100 0xx 0ss 000 xxx (clr,neg,negx,not) where if driven onto the a-bus will also drive onto the d-bus.

ry = rw2
    irc2[3:0] muxed onto ry[3:0]
      use rw2
```
         movem ea,rl   0100 110 01x xxx xxx
         div.l         0100 110 001 xxx xxx
         bfield        1110 xxx xxx xxx xxx
         cop           1111 xxx xxx xxx xxx
```
    do not allow register to be written to
```
         div.w         1000 xxx x11 xxx xxx
```
    force ry[3] = 0
```
         div.l         0100 110 001 xxx xxx
         bfield        1110 1xx x11 xxx xxx
``` ry = rw2/dt
    conditionally substitute rw2 or dt
    use rw2 and force ry[3]=0
```
         mul.l         0100 110 000 xxx xxx
                       and irc2[10] = 1
         div.l         0100 110 001 xxx xxx
                       and irc2[10] = 1
``` ry = vdtl    points @ virtual data temporary ry = vat2    points @ virtual address temporary 2 ry = dty    points @ dt

AU - ARITHMETIC UNIT OPERATIONS:

0- ASDEC  add/sub  add/sub based on residual control
                          sub if ird = xxxx xxx xxx 100 xxx 1- ASXS   add/sub  add/sub based on residual (use alu add/sub). Do not extend db entry add if ird = 1101 xxx xxx xxx xxx add

5 or   0101 xxx 0xx xxx xxx addq

| | | |
|---|---|---|
| 2- SUB | sub | subtract AB from DB |
| 3- DIV | add/sub | do add if aut[31] = 1, sub if aut[31] = 0; take db (part rem) shift by 1 shifting in alut[31] then do the add/sub. |
| 4- NIL | | |
| 6- SUBZX | sub | zero extend DB according to size then sub AB |
| 8- ADDX8 | add | sign extend DB 8 -> 32 bits then add to AB |
| 9- ADDX6 | add | sign extend DB 16 -> 32 bits then add to AB |
| 10- ADD | add | add AB to DB |
| 11- MULT | add | shift DB by 2 then add constant sign/zero extend based on residual and previous aluop<br>  muls = always sxtd<br>  mulu = sxtd when sub in previous aluop |
| 12- ADDXS | add | sign extend DB based on size then add to AB |
| 13- ADDSE | add | sign extend DB based on size then shift the extended result by 0,1,2,3 bits depending upon irc[10:9]. Finally add this to AB |
| 14- ADDZX | add | zero extend DB according to size then add to AB |
| 15- ADDSZ | add | zero extend DB according to size, shift by 2, then add |

CONSTANTS 0,1     1 selected by:
        (div * allzero) + (mult * alu carry = 0)

1,2,3,4   selected by size
          byte = 1
          word = 2
          3-by = 3
          long = 4

If (Rx=SP or Ry=SP) and (Ry=Ry or Rx=Rx) and (Rx or Ry is a source and destination) and (au constant = 1,2,3,4) and (size = byte) then constant = 2 rather than one.

ALU - ARITHMETIC AND LOGIC UNIT OPERATIONS:

```
col0 = x,nil
col1 = and
col2 = alu1,div,mult,or
col3 = alu2,sub
```

| row |         | col 1 | col 2 | col 3 |
|-----|---------|-------|-------|-------|
| 1   | ADDROW  | and   | add   |       |
| 2   | ADDXROW | and   | addx  | add   |
| 3   | SUBROW  | and   | sub   |       |
| 4   | SUBXROW | and   | subx  | addl  |
| 5   | DIVROW  | and   | div   | sub   |
| 6   | MULTROW | and   | mult  | sub   |
| 7   | ANDROW  | and   | and   |       |
| 8   | EORROW  | and   | eor   |       |
| 9   | ORROW   | and   | or    | add   |
| 10  | NOTROW  | and   | not   |       |
| 11  | CHGROW  | and   | chg   |       |
| 12  | CLRROW  | and   | clr   |       |
| 13  | SETROW  | and   | set   |       |

```
                                  cin
add     db + ab                   0
addx    db + ab                   x
addl    db + ab                   1
and     ab ^ db                   -
chg     ab xor k=-1               -
clr     ab ^ k=0                  -
eor     ab xor db                 -
not     ~ab v db                  -
or      ab v db                   -
set     ab v k=-1                 -
sub     db + ab                   1
subx    db + ab                   x
mult    (db shifted by 2) add/sub (ab shifted by 0,1,2
        (if 0 then add/sub 0)) control for add/sub and
        shift amount comes from regb. Don't assert atrue
        for mult
                        cin = 0
div     build part. quot and advance part. remain.1
        ab (pr.1:pq) shifted by 1, add0,
        value shifted in = au carry (quot bit)
                        cin = 0
        must assert atrue for div
```

7

The condition codes are updated during late T3
based upon the data in alut and/or rega. These
registers can be written to during T3. In the
case of rega, there are times when the value to
be tested is the result of an insertion from regb.

CC - CONDITION CODE UPDATE CONTROL:

```
row                col 1            col 2            col 3
---                -----            -----            -----
1    add           cnzvc            ddddd            ddddd
2    addx          cnzvc            ddkdc (bcd1)     cdzdc (bcd2)
3    sub           cnzvc            knzvc (cmp)      ddddd
4    subx          cnzvc            ddkdc (bcd1)     cdzdc (bcd2)
5    div           knzv0 (div)      ddddd            ddddd
6    mull          knzv0            ddddd            ddddd
7    rotat         knz0c            ddddd            ddddd
8    rox           cnz0c            knz00            kkkvk
9    bit,bitfld    kkzkk (bit)      knz00 (bfld1)    kkzkk (bfld2)
10   log           knz00            ddddd            ddddd standard
  n = alut msb (by size)
  z = alut=0 (by size)

non-standard
  add      c = cout
           v = vout
  addx.1   c = cout
           z = pswz ^ locz
           v = vout
  bcd1     c = cout
  bcd2     c = cout v pswc
           z = pswz ^ locz
  bfld1    n = shiftend
           z = all zero
  bfld2    z = pswz ^ allzero
  bit      z = allzero
  div      v = au carry out
  mull     n = (shiftend ^ ~irc2[10]) v
               (alut[31] ^ ~irc2[10])
           z = (alut=0 ^ shift allzero ^ irc2[10]) v
               (alut=0 ^ ~irc2[10])
           v = ~irc2[10] ^ ((irc2[11] ^ (~allzero ^
               ~alut[31]) v (~allone ^ alut[31])) v
               (~irc2[11] ^ ~allzero))
  rotat    c = shiftend = (sc=0 - 0   sc<>0 - end)
  rox.1    c = shiftend = (sc=0 - pswx  sc<>0 - end)
           ! can do this in two steps as knz0c where
           ! c=pswx and cnz0c where c=shiftend (not
           ! with share row with shift)
  rox.3    v = shift overflow = ((~allzero ^ sc>sz) v
               (~(allzero v allones) ^ sc<=sz))
```

```
                    ! can simplify this if we don't share
                    ! rows but it will cost another box
    sub.1   c = ~cout
            v =  vout
    sub.2   c = ~cout
            v =  vout
    subx.1  c = ~cout
            z = pswz ^ locz
            v =  vout
    subx.2  c = ~cout
    subx.3  c = ~cout v pswc
            z = pswz ^ locz
```

The meaning and source of signals which are used to set the condition codes is listed below:

```
    allzero  = every bit in rega field = 0 where the
               field is defined as starting at the bit
               pointed to by start and ending (including)
               at the bit pointed to by end.
               (see shift control)

allone   = every bit in rega field = 1 where the
               field is defined as starting at the bit
               pointed to by start and ending (including)
               at the bit pointed to by end.
               (see shift control)

shiftend = the bit in rega pointed to by end = 1.
               (see shift control)

locz     = all alut for the applicable size = 0.
```

SHFTO - SHIFTER OPERATIONS:

```
    ror    value in rega is rotated right by value in shift
           count register into regb.

sxtd   value in rega defined by start and end registers
           is sign extended to fill the undefined bits and
           that value is rotated right by the value in the
           shift count register. The result is in regb.

xxtd   value in rega defined by start and end registers
           is PSWX extended to fill the undefined bits and
           that value is rotated right by the value in the
           shift count register. The result is in regb.

zxtd   value in rega defined by start and end registers
           is zero extended to fill the undefined bits and
           that value is rotated right by the value in the
           shift count register. The result is in regb.
``` ins  the value in regb is rotated left by the value in shift count register and then inserted into the field defined by the start and end register in rega. Bits in rega that are not defined by start and end are not modified.

boffs  provides the byte offset in regb. If irc2[11]=1 then the offset is contained in R0 and as such rega should be sign extended from rega to regb using the values established in start, end, and shift count of 3,31,3 respectively. If irc2[11]=0 then the offset is contained in the immediate field and should be loaded from irc2[10:6] or probably more conveniently osr[4:0]. This value however should be shifted by 3 bits such that osr[4:3] are loaded onto regb[1:0] with zero zero extension of the remaining bits.

offs  provides the offset in regb. If irc2[11]=1 then the offset is contained in R0 and as such DB>REGB should be allowed to take place. If irc2[11]=0 then the offset is contained in the immediate field and osr[4:0] should be loaded onto regb[4:0] with zero extension of the remaining bits.

SHFTC - SHIFTER CONTROL:

```
           {sbm1}                              {sbm2}
BIT        st = 0                              st = wr - 8
bit        en = -1        (31)                 en = wr - 1
mvp        sc = wr        (16,32)              sc = wr - 8
swap       wr = BC[12:7]  (16,32)              wr = wr - 8
callm      osr = x                             osr = x
           cnt = x                             cnt = x {sbm3}                              {sbm4}
           st = DB [5:0] mod sz                st = 0
           en = DB [5:0] mod sz                en = -1        (31)
           sc = 0                              sc = wr
           wr = DB [5:0]                       wr = wr
           osr = x                             osr = x
           cnt = x                             cnt = x {sbm5}                              {sbm6}
           st = x                              st = 16
           en = x                              en = 31
           sc = x                              sc = 16
           wr = DB [7:2]                       wr = wr - 1
           osr = x                             osr = x
           cnt[1:0] = DB [1:0]                 cnt = x {}
           st = x
           en = x
           sc = x
```

10

```
              wr = x
              osr = x
              cnt = x

{mul1}                          {mul2}
MUL           st = wr                         st = wr - 2
mulw          en = -1 mod sz    (15,31)       en = wr
mull          sc = wr                         sc = wr - 2
              wr = BC[12:7]     (14,30)       wr = wr - 2
              osr = x                         osr = x
              cnt = x                         cnt = x {mul3}                          {mul4}
              st = 0                          st = 0
              en = -1           (31)          en = en
              sc = x                          sc = x
              wr = x                          wr = x
              osr = x                         osr = x
              cnt = x                         cnt = x { }                             {mul6}
              st = x                          st = 16
              en = x                          en = 31
              sc = x                          sc = 16
              wr = x                          wr = x
              osr = x                         osr = x
              cnt = x                         cnt = x { }
              st = x
              en = x
              sc = x
              wr = x
              osr = x
              cnt = x {divw1}                         {divw2}
divw          st = 0                          st = 0
              en = 31                         en = -1 mod sz    (15)
              sc = wr           (16)          sc = 16
              wr = BC[12:7]     (16)          wr = wr - 1
              osr = x                         osr = x
              cnt = x                         cnt = x {divw3}                         {divw4}
              st = wr           (16)          st = 0
              en = -1           (31)          en = 31
              sc = wr           (16)          sc = wr
              wr = BC[12:7]     (16)          wr = x
              osr = x                         osr = x
              cnt = x                         cnt = x {divw5}                         {divw6}
              st = 4                          st = 16
```

11

```
            en = -1 mod size  (7)           en = 31
            sc = 28                         sc = 16
            wr = x                          wr = x
            osr = x                         osr = x
            cnt = x                         cnt = x {divw7}
            st = st
            en = -1            (31)
            sc = 0
            wr = x
            osr = x
            cnt = x {divl1}                         {divl2}
    divl    st = wr - 1        (31)         st = 0
            en = -1            (31)         en = -1            (31)
            sc = x                          sc = 0
            wr = BC[12:7]      (32)         wr = wr - 1
            osr = x                         osr = x
            cnt = x                         cnt = x {divl3}                         {divl4}
            st = 0                          st = 0
            en = -1            (31)         en = 31
            sc = 0                          sc = 0
            wr = x                          wr = x
            osr = x                         osr = x
            cnt = x                         cnt = x {}                              {divl6}
            st = x                          st = 16
            en = x                          en = 31
            sc = x                          sc = 16
            wr = x                          wr = x
            osr = x                         osr = x
            cnt = x                         cnt = x {}
            st = x
            en = x
            sc = x
            wr = x
            osr = x
            cnt = x {}                              {}
    unk     st = x                          st = x
            en = x                          en = x
            sc = x                          sc = x
            wr = x                          wr = x
            osr = x                         osr = x
            cnt = x                         cnt = x
```

12

```
          {}                                  {}
          st = x                              st = x
          en = x                              en = x
          sc = x                              sc = x
          wr = x                              wr = x
          osr = x                             osr = x
          cnt = x                             cnt = x {}                                  {unk6}
          st = x                              st = 16
          en = x                              en = 31
          sc = x                              sc = 16
          wr = x                              wr = x
          osr = x                             osr = x
          cnt = x                             cnt = x {}
          st = x
          en = x
          sc = x
          wr = x
          osr = x
          cnt = x {asl1}                              {asl2}
  asl     st = 0                              st = x
          en = osr + ~wr                      en = ~(wr-1) mod sz
          sc = ~wr + 1                        sc = x
          wr = DB[5:0] or BC[12:7] (Q)        wr = wr
          osr = BC[5:0]     (8,16,32)         osr = osr
          cnt = x                             cnt = x {asl3}                              {asl4}
          st = 0                              st = osr + ~wr
          en = osr - 1                        en = -1 mod sz
          sc = x                              sc = x
          wr = wr                             wr = wr
          osr = x                             osr = x
          cnt = x                             cnt = x {}                                  {asl6}
          st = x                              st = 16
          en = x                              en = 31
          sc = x                              sc = 16
          wr = x                              wr = x
          osr = x                             osr = x
          cnt = x                             cnt = x {}
          st = x
          en = x
          sc = x
          wr = x
          osr = x
```

```
            cnt = x

{asr1}                          {asr2}
asr     st = wr                         st = wr - 1
        en = osr - 1                    en = (wr - 1) mod sz
        sc = wr                         sc = x
        wr = DB [5:0] or BC[12:7]  (Q)  wr = wr
        osr = BC[5:0]    (8,16,32)      osr = osr
        cnt = x                         cnt = x {asr3}                          { }
        st = osr - 1                    st = x
        en = osr - 1                    en = x
        sc = x                          sc = x
        wr = wr                         wr = x
        osr = osr                       osr = x
        cnt = x                         cnt = x { }                             {asr6}
        st = x                          st = 16
        en = x                          en = 31
        sc = x                          sc = 16
        wr = x                          wr = x
        osr = x                         osr = x
        cnt = x                         cnt = x { }
        st = x
        en = x
        sc = x
        wr = x
        osr = x
        cnt = x {rotl1}                         {rotl2}
rotl    st = osr                        st = x
        en = -1            (31)         en = ~(wr - 1) mod sz
        sc = osr                        sc = x
        wr = DB [5:0] or BC[12:7]  (Q)  wr = wr
        osr = BC[5:0]    (8,16,32)      osr = osr
        cnt = x                         cnt = x {rotl3}                         { }
        st = 0                          st = x
        en = 31                         en = x
        sc = ~(wr - 1) mod sz           sc = x
        wr = wr                         wr = x
        osr = osr                       osr = x
        cnt = x                         cnt = x { }                             {rotl6}
        st = x                          st = 16
        en = x                          en = 31
        sc = x                          sc = 16
```

14

```
              wr = x                              wr = x
              osr = x                             osr = x
              cnt = x                             cnt = x { }
              st = x
              en = x
              sc = x
              wr = x
              osr = x
              cnt = x {rotr1}                             {rotr2}
       rotr   st = osr                            st = x
              en = -1              (31)           en = (wr - 1) mod sz
              sc = osr                            sc = x
              wr = DB [5:0] or BC[12:7]-(Q)       wr = wr
              osr = BC[5:0]        (8,16,32)      osr = osr
              cnt = x                             cnt = x {rotr3}                             { }
              st = 0                              st = x
              en = 31                             en = x
              sc = wr mod sz                      sc = x
              wr = wr                             wr = x
              osr = osr                           osr = x
              cnt = x                             cnt = x { }                                 {rotr6}
              st = x                              st = 16
              en = x                              en = 31
              sc = x                              sc = 16
              wr = x                              wr = x
              osr = x                             osr = x
              cnt = x                             cnt = x { }
              st = x
              en = x
              sc = x
              wr = x
              osr = x
              cnt = x {roxl1}                             {roxl2}
       roxl   st = 0                              st = 0
              en = osr + ~wr       (14)           en = (osr - wr) mod sz
              sc = -1              (31)           sc = 0
              wr = BC[12:7]        (1)            wr = wr
              osr = BC[5:0]        (16)           osr = osr
              cnt = x                             cnt = x {roxl3}                             {roxl4}
              st = (~(wr-1) + 1) mod sz           st = 0
```

```
       en = -1 mod sz                        en = osr + ~wr
       sc = (~(wr-1) + 1) mod sz             sc = ~wr + 1
       wr = DB [5:0] or BC[12:7]  (Q)        wr = wr
       osr = BC[5:0]     (8,16,32)           osr = osr
       cnt = x                               cnt = x {rox15}                               {rox16}
       st = (~(wr-1) + 1) mod sz             st = 16
       en = -1 mod sz                        en = 31
       sc = (~(wr-1) + 1) mod sz             sc = 16
       wr = wr                               wr = wr - 1 - osr
       osr = osr                             osr = osr
       cnt = x                               cnt = x {rox17}
       st = wr - 1
       en = osr - 1
       sc = 0
       wr = wr
       osr = osr
       cnt = x {roxr1}                               {roxr2}
roxr   st = wr                               st = 0
       en = osr - 1                          en = (wr - 1) mod sz
       sc = wr                               sc = 0
       wr = BC[12:7]     (1)                 wr = wr
       osr = BC[5:0]     (16)                osr = osr
       cnt = x                               cnt = x {roxr3}                               {roxr4}
       st = 0                                st = wr
       en = (wr-1) - 1                       en = osr - 1
       sc = (wr-1) + 24,16,0                 sc = wr
       wr = DB [5:0] or BC[12:7]  (Q)        wr = wr
       osr = BC[5:0]     (8,16,32)           osr = osr
       cnt = x                               cnt = x {roxr5}                               {roxr6}
       st = 0                                st = 16
       en = (wr-1) - 1                       en = 31
       sc = (wr-1) + 24,16,0                 sc = 16
       wr = wr                               wr = wr - 1 - osr
       osr = osr                             osr = osr
       cnt = x                               cnt = x {roxr7}
       st = 0
       en = osr - wr
       sc = 0
       wr = wr
       osr = osr
       cnt = x
```

16 bfreg
```
{bfrg1}                                 {bfrg2}
st = 0                                  st = 0
en = 31                                 en = wr - 1
sc = osr + wr                           sc = 0
wr = DB[4:0] or IRC2[4:0]               wr = wr
osr = REGB[4:0] or IRC2[10:6]           osr = osr
cnt = x                                 cnt = x {bfrg3}                                 {}
st = 0                                  st = x
en = 31                                 en = x
sc = osr + wr                           sc = x
wr = wr                                 wr = x
osr = osr                               osr = x
cnt = x                                 cnt = x {bfrg5}                                 {bfrg6}
st = x                                  st = 16
en = x                                  en = 31
sc = x                                  sc = 16
wr = wr                                 wr = wr
osr = x                                 osr = osr
cnt[1:0] = DB [1:0]                     cnt = x {bfrg7}
st = 0
en = 31
sc = 25
wr = x
osr = x
cnt = x
``` bfmt
```
{bfmt1}                                 {bfmt2}
st = 3                                  st = 00:
                                            ~(osr[2:0]+(wr-1))
en = -1            (31)                 en = (osr[2:0]+(wr-1))
                                            [4:3]:~osr[2:0]
sc = 3                                  sc = 0
wr = DB[4:0] or IRC2[4:0]               wr = wr
osr = REGB[4:0] or IRC2[10:6]           osr = osr
cnt = x                                 cnt = (osr[2:0]+
                                              (wr-1)) [5:3]

{bfmt3}                                 {bfmt4}
st = 0                                  st = 00:
                                            ~(osr[2:0]+(wr-1))
en = 11:~osr[2:0]                       en = -1 mod sz    (7)
sc = 0                                  sc = 0
wr = wr                                 wr = wr
osr = osr                               osr = x
cnt = x                                 cnt = x {bfmt5}                                 {bfmt6}
st = x                                  st = 16
```

```
                en = x                              en = 31
                sc = x                              sc = 16
                wr = x                              wr = wr
                osr = x                             osr = osr
                cnt = x                             cnt = x {bfmt7}
                st = x
                en = x
                sc = x
                wr = x
                osr = x
                cnt = x {bfmi1}                             {bfmi2}
        bfmi    st = 3                              st = 00:
                                                         ~(osr[2:0]+(wr-1))
                en = -1         (31)                en = (osr[2:0]+(wr-1))
                                                         [4:3]:~osr[2:0]
                sc = 3                              sc = 00:
                                                         ~(osr[2:0]+(wr-1))
                wr = DB[4:0] or IRC2[4:0]           wr = wr
                osr = REGB[4:0] or IRC2[10:6]       osr = osr
                cnt = x                             cnt = (osr[2:0]+
                                                         (wr-1)) [5:3]

{bfmi3}                             {bfmi4}
                st = 0                              st = 00:
                                                         ~(osr[2:0]+(wr-1))
                en = 11:~osr[2:0]                   en = -1 mod sz   (7)
                sc = 11:~(osr[2:0]+(wr-1))          sc = 00:
                                                         ~(osr[2:0]+(wr-1))
                wr = wr                             wr = wr
                osr = osr                           osr = x
                cnt = x                             cnt = x {bfmi5}                             {bfmi6}
                st = 0                              st = 16
                en = 00:(osr[2:0]+(wr-1))           en = 31
                sc = 25+(00:                        sc = 16
                    (osr[2:0]+(wr-1)))
                wr = wr                             wr = wr
                osr = x                             osr = osr
                cnt[1:0] = DB [1:0]                 cnt = x {bfmi7}
                st = 0
                en = 31
                sc = 25
                wr = x
                osr = x
                cnt = x
``` cop
```
    {cop1}                      {cop2}
    st  = x                     st  = x
    en  = x                     en  = x
    sc  = x                     sc  = x
    wr  = x                     wr  = wr - 1
    osr = x                     osr = x
    cnt = x                     cnt = x {cop3}                      {cop4}
    st  = x                     st  = x
    en  = x                     en  = x
    sc  = x                     sc  = x
    wr  = x                     wr  = x
    osr = x                     osr = x
    cnt = x                     cnt = x {cop5}                      {cop6}
    st  = x                     st  = 16
    en  = x                     en  = 31
    sc  = x                     sc  = 16
    wr  = DB [7:2]              wr  = x
    osr = x                     osr = x
    cnt[1:0] = DB [1:0]         cnt = x {cop7}
    st  = x
    en  = x
    sc  = x
    wr  = x
    osr = x
    cnt = x
```

*1* loaded based on ird[5] - if ird[5] = 0 then wr value comes from BC bus else value is loaded from regc.

FTU - FIELD TRANSLATION UNIT OPERATIONS:

3- LDCR  load the control register from regb. The register is selected by the value in ar[1:0], this can be gated onto the rx bus.

4- DPSW  load the psw with the value in regb. Either the ccr or the psw is loaded depending upon size. If size = byte then only load the ccr portion.

14- CLRFP  clear the f-trace pending latch. (fpend2 only)

17- LDSH2  load the contents of the shifter control registers from regb. These include wr,osr,count.

19- LDSWB   load the internal bus register from regb.
            This is composed of bus controller state
            information which must be accessed by the
            user in fault situations.

21- LDSWI   load the first word of sswi (internal
            status word) from regb. This is composed of
            tpend, fpend1, fpend2, ar latch 23- LDSH1   load the contents of the shifter control
            registers from regb. These include
            st,en,sc.

25- LDUPC   load micro pc into A4 from regb and check
            validity of rev #.

26- LDPER   load per with the value on the a-bus.
            (should be a T3 load). ab>per 28- LDARL   load the ar latch from regb. May be able to
            share with ldswi or ldswj 29- 0PSWM   clear the psw master bit.

33- RPER    load output of per into ar latch and onto
            bc bus. There are two operations which
            use this function, MOVEM and BFFFO. MOVEM
            requires the least significant bit of the
            lower word (16-bits only) that is a one to
            be encoded and latched into the AR latch
            and onto the BC BUS (inverted) so that it
            can be used to point at a register. If no
            bits are one then the end signal should be
            active which is routed to the branch pla.
            After doing the encoding, the least
            significant bit should be cleared.

For BFFFO it is necessary to find the most
            significant bit of a long word that is a
            one. This value is encoded into 6 bits
            where the most significant bit is the
            32-bit all zero signal. Thus the following
            bits would yield the corresponding
            encoding.

| most sig bit set | per out | onto bc bus |
|---|---|---|
| 31 | 0 11111 | 1110 0000 |
| 16 | 0 10000 | 1110 1111 |
| 0  | 0 00000 | 1111 1111 |
| NONE | 1 11111 | 0000 0000 |

The output is then gated onto the BC bus
            where it is sign extended to an 8-bit value. It does not hurt anything in the BFFFO case to load the other latch (i.e. BFFFO can load the AR latch).
For BFFFO it does not matter if a bit is cleared.

34- STCR    store the control register in regb. The register is selected by the value in ar[1:0], this can be gated onto the rx bus.

37- STPSW   store the psw or the ccr in regb based on size. If size = byte then store ccr only with bits 8 - 15 as zeros.

38- 0PEND   store the psw in regb then set the supervisor bit and clear the trace bit in the psw. Tpend and Fpend are cleared. The whole psw is stored in regb.

39- 1PSWS   store the psw in regb then set the supervisor bit and clear both trace bits in the psw. The whole psw is stored in regb.

40- STINST  store IRD decoded information onto the BC bus and into regb. This data can be latched from the BC bus into other latches (i.e. wr & osr) by other control.

41- STIRD   store the ird in regb.

43- STINL   store the new interrupt level in pswi and regb. The three bits are loaded into the corresponding pswi bits. The same three bits are loaded onto bc bus [3:1] with bc bus [31:4] = 1 and [0] = 1, which is loaded into regb. Clear IPEND the following T1.

44- STV#    store the format & vector number associated with the exception in regb.

```
+--+--+--+--+--+--+--+--+--+--+--+--+--+--+--+--+
| X| X|   FORMAT  | 0| 0|      VECTOR NUMBER    |
+--+--+--+--+--+--+--+--+--+--+--+--+--+--+--+--+
 15 14 13 12 11 10  9  8  7  6  5  4  3  2  1  0
```

47- STCRC   store the contents of the CRC register in regb. Latch A4 with microaddress.

48  STSH2   store the contents of the shifter control registers into regb. These include wr,osr,count. Store high portion of shift control 50- STSWB   store the internal bus register in regb.

This is composed of bus controller state information which must be accessed by the user in fault situations.

52- STSWI    store sswi (internal status word) in regb. The sswi is composed of tpend, ar latch, fpend1, fpend2

54- STSH1    store the contents of the shifter control registers into regb. These include st,en,sc.

56- STUPC    store the micro pc in regb.

```
+--+--+--+--+---+--+--+--+--+--+--+--+--+--+--+--+
| REV NUMBER|CRC|        MICRO PC                |
+--+--+--+--+---+--+--+--+--+--+--+--+--+--+--+--+
 15 14 13 12 11 10 9  8  7  6  5  4  3  2  1  0
```

62- NONE

63- STPER    store the per onto the a-bus. (should be a T1 transfer). per>ab

PC - PC SECTION OPERATIONS:

```
               AOBP[1]
            0           1

31 - 3PFI  | EV3FI  | OD3FI |
30 - 3PFF  | TPF    | EV3FI |
```

0- NF
```
    aobpt>db>sas
    tp2>ab>sas
```

1- TPF
```
    aobpt>db>tp1
    aobpt>db>aup>aobp*,aobpt
    +2>aup
    tp1>tp2
    tp2>ab>sas
```

2- PCR
```
    tp2>ab>a-sect
    (if ry=pc then connect pc and address section)
    aobpt>db>sas
```

3- PCRF
```
    aobpt>db>tp1
    aobpt>db>aup>aobp*,aobpt
    +2>aup
    tp1>tp2
    tp2>ab>a-sect
```

22

(if ry=pc then connect pc and address section)

4- JMP1
```
    tp2>db>a-sect
    a-sect>ab>aobpt
```

5- BOB
```
    aobpt>db>tp1
    tp1>tp2
    tp2>ab>sas
```

- EV3FI
```
    aobpt>db>tp1*
    aobpt>db>aup>aobpt
    +4>aup
    tp2>ab>sas
```

- OD3FI
```
    aobpt>db>aup>aobpt,tp2
    +2>aup
    tp2>ab>sas
```

7- TRAP
```
    tp2>db>a-sect
    pc>ab>sas
```

8- TRAP2
```
    tp2>ab>a-sect
    aobpt>db>sas
```

9- JMP2
```
    a-sect>ab>aobpt
    aobpt>db>sas
```

10- PCOUT
```
    pc>ab>a-sect
    aobpt>db>sas
```

11- NPC   Conditional update based on cc=t/f
```
    tp2>db>aup,a-sect
    a-sect>ab>aup>aobpt
```

12- LDTP2
```
    a-sect>ab>tp2
    aobpt>db>sas
```

13- SAVE1
```
    pad>aobp
    aobpt>db>sas
    tp2>ab>sas
```

15- SAVE2
```
    aobp>db>tp1
    tp2>ab>sas
```

14- FIX
    aobpt>db>tp1
    tp2>ab>aobpt
    tp1>tp2

16- LDPC
    tp2>pc
    aobpt>db>sas
    tp2>ab>sas

PIPE - PIPE OPERATIONS:

Description of bit encodings.
    [6] = use irc
    [5] = change of flow
    [4] = fetch instruction
    [3:0] = previously defined pipe control
            functionality.

```
                          AOBP[1]
                        0         1

0 1 1 3 -   3UDI    | EV3Fa   | OD3F  |
1 0 1 7 -   3UDF    | TUD     | EV3Fb |
```

- EV3Fa
    chrl>irb
    chrh>pb>imh,iml,irc
    change of flow
    fetch instr

- EV3Fb
    chrl>irb
    chrh>pb>imh,iml,irc
    irc>ir                   ! implies use irc
    use pipe
    fetch instr

- OD3F
    chrl>pb>irc
    ! force miss regardless of whether odd or even
    change of flow
    fetch instr 0 0 0 0 - NUD
    x 1 0 0 0 - UPIPE
    use pipe 0 0 1 1- FIX2                Always transfer irb up pipe

```
        chr>irb              to irc,im and if irb needs
        irb>pb>imh,iml,irc   to be replaced, do access
                             and transfer chr to irb.
        ! force miss regardless of whether odd or even
        change of flow,
        fetch instr db>ird               else load irb from d-bus.
        irb>pb>imh,iml,irc
        change of flow
        fetch instr 0 0 0 2 - IRAD
        ira>db 0 0 0 4 - IRTOD
        ir>ird 0 0 1 5 - FIX1
        chr>irb              if irc needs to be replaced,
                             do access and transfer chr
                             to irb, else no activity.
        ! force miss regardless of whether odd or even
        change of flow
        fetch instr 1 0 0 6 - 2TOC
        irc2>irc
        irc>ir
        use pipe 0 0 0 8 - CLRA
        clear irc2[14]
        ira>ab               zxtd 8 -> 32

0 0 0 9 - STIRA
        db>>ira
        ira>pb>irc2

0 0 0 11 - ATOC
        db>>ira
        ira>pb>irc 0 0 1 13 - EUD
        chr>irb
        irb>pb>imh,iml
        fetch instr 1 0 0 14 - CTOD
        irc>ir,ird
        irb>irc
        use pipe 1 0 1 15 - TUD
```

```
        chr>irb
        irb>pb>imh,iml,irc
        irc>ir
        use pipe
        fetch instr 0 1 1 15 - TOAD
        chr>irb
        irb>pb>imh,iml,irc
        irc>ir
        change of flow
        fetch instr
```

We claim:

1. In a microcoded data processor having:

an address port for providing addresses;

an operand port for receiving instructions and data;

an instruction register for temporarily storing each of said instructions; and at least one PLA for decoding the instruction in the instruction register and providing a plurality of outputs in response thereto;

a method for recursively testing the PLA comprising the steps of:

accepting as an instruction operand a selected test value via the operand port;

loading said selected test value into said instruction register;

allowing said PLA to decode said selected test value as if it were one of said instructions and to provide said plurality of outputs in response thereto;

extracting a selected portion of said plurality of outputs provided by said PLA in response to the decoding of said selected test value; and providing as if it were an instruction address said extracted portion of said plurality of outputs of said PLA via said address port;

whereby the PLA may be tested by:

(1) providing a predetermined sequence of said selected test values to said data processor via said operand port; and (2) comparing each of said instruction addresses provided by said data processor via said address port to a selected one of a plurality of expected values; so that the PLA can be tested by using only said address and said operand ports.

* * * * *